Aug. 7, 1928.

L. EDELMANN 1,680,139

ROAD LIGHT

Filed Oct. 20, 1925      3 Sheets-Sheet 1

Inventor
Leo Edelmann,
By Lloyd W. Patch
his Attorney

Aug. 7, 1928.

L. EDELMANN

ROAD LIGHT 1,680,139

Filed Oct. 20, 1925   3 Sheets-Sheet 2

Inventor
Leo Edelmann,
By Lloyd W. Patch
his Attorney

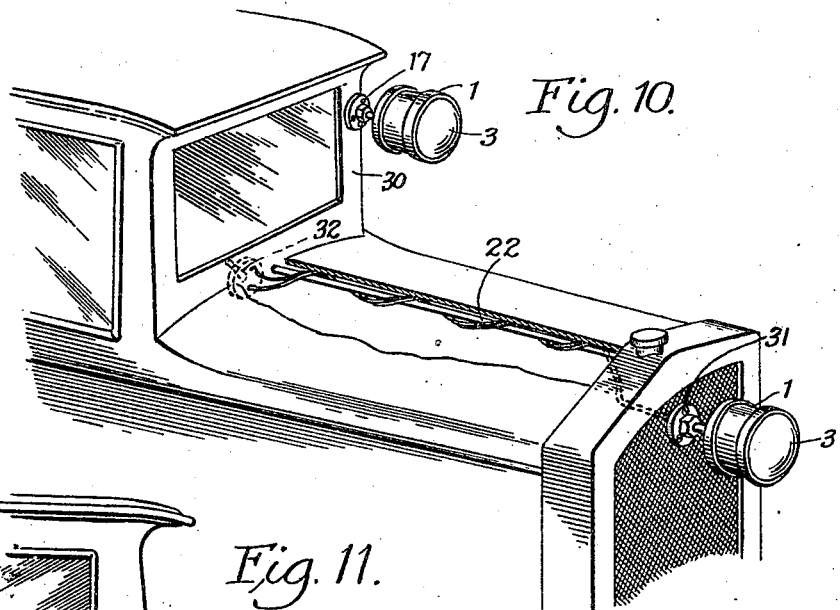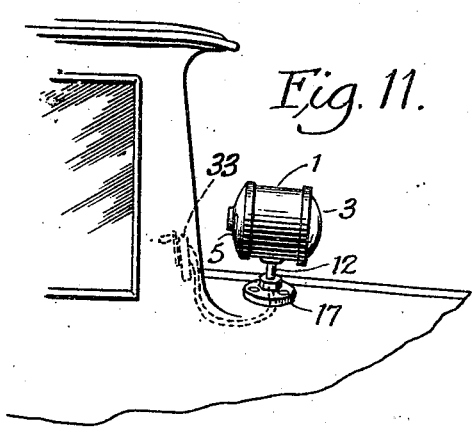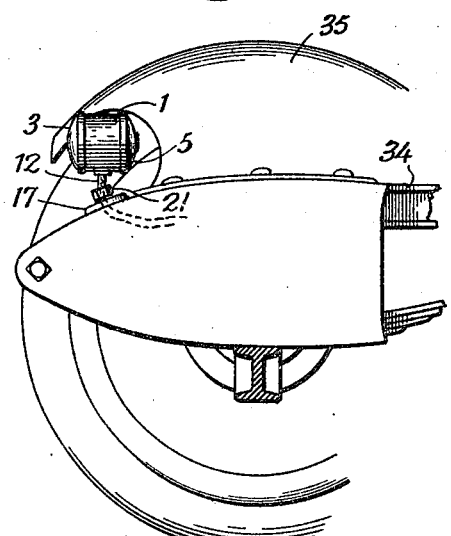

Patented Aug. 7, 1928.

1,680,139

UNITED STATES PATENT OFFICE.

LEO EDELMANN, OF CHICAGO, ILLINOIS, ASSIGNOR TO E. EDELMANN & CO., OF CHICAGO, ILLINOIS, A CORPORATION OF ILLINOIS.

ROAD LIGHT.

Application filed October 20, 1925. Serial No. 63,786.

This invention relates to road lights, and particularly to a light adapted to be installed upon an automobile to light the path in front of the machine or to illuminate in the rear of the automobile as a back-up light.

An object of this invention is to provide a road light adapted to have the lamp casing thereof adjustably mounted so that the light rays can be directed at any desired angle with respect to the path of travel of the vehicle.

A further object is to so construct the parts that a mounting bracket can be interchangeably connected with the light casing rearwardly substantially in line with the light projection path, or at an angle thereto, to thus adapt the road light for use and mounting upon different portions of the automobile structure.

Still another object is to so construct the light casing and mounting as to provide for interchangeable and swinging adjustment of the light casing with respect to the mounting, and with which adjustments can be locked and retained.

With the above and other objects in view, which will be apparent to those skilled in the art, my invention includes certain novel features of construction and combinations of parts which will be set forth in connection with the drawing.

In the drawing:

Figures 10, 11 and 12 show still other mountings of my improved road light upon an automobile.

Figure 1:
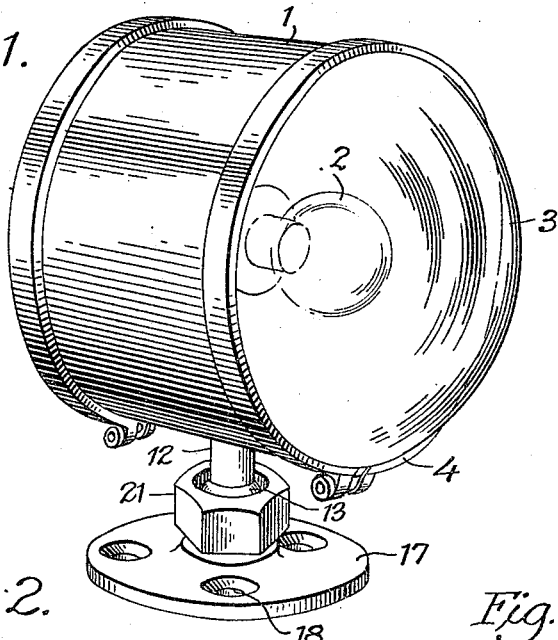
Figure 1 is a view in perspective of my improved road light.
Figure 2:
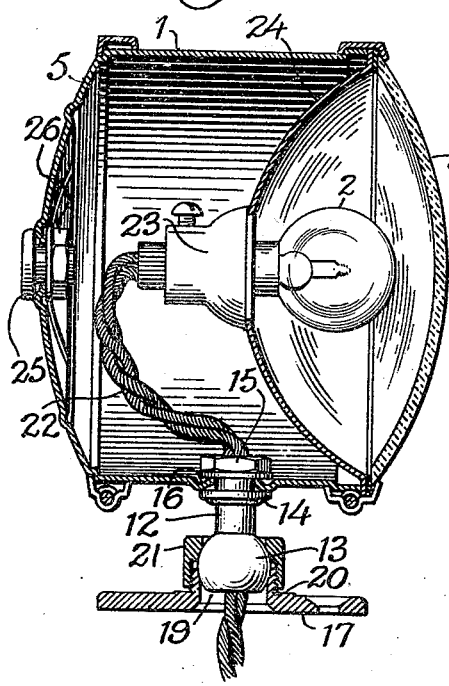
Figure 2 is a longitudinal vertical sectional view.
Figure 3:
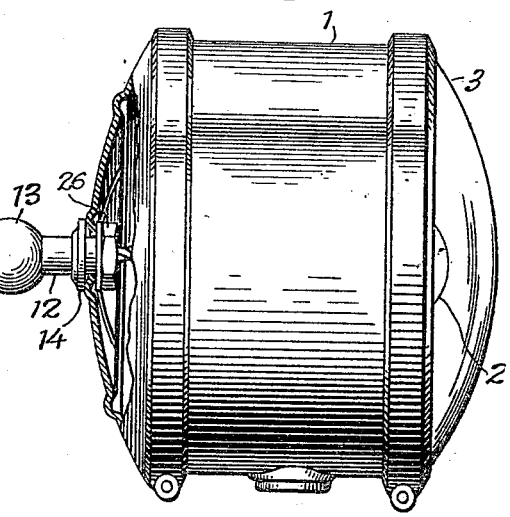
Figure 3 is a view in side elevation of the lamp casing with the mounting bracket attached at the rear thereof.
Figure 4:
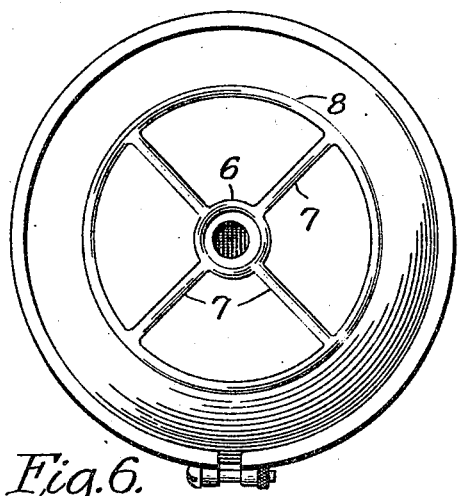
Figure 4 is a view in rear elevation of the lamp casing.
Figure 5:
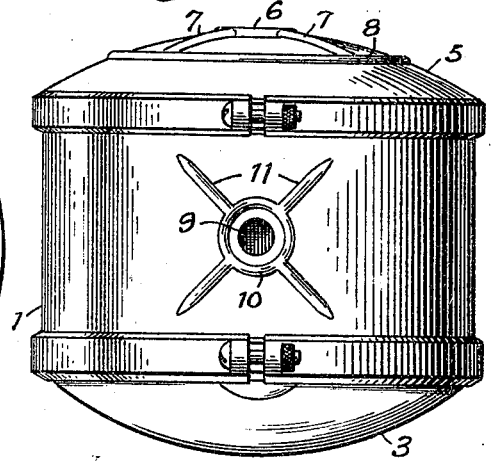
Figure 5 is a bottom plan view showing the lamp casing.

The light casing 1 which is here shown as of the drum type, has a light bulb 2 mounted therein to project its rays through one end of the case, any suitable reflector structure being provided to concentrate and direct the light rays. A lens or glass 3 is held in place by retaining ring 4 to close the open end of the casing 1.

The closed end 5 of the casing has a central opening 6 therethrough and is provided with radial and circular reinforcing corrugations 7 and 8, so that the wall or end 5 is thoroughly braced and reinforced around the opening 6. A similar opening 9 is provided through the underside of the wall of the casing 1, and the circular and radial corrugations 10 and 11 reinforce and strengthen the body of the casing around this opening. A supporting bracket member 12, in the form of a stem provided with a central bore has a bearing ball 13 at one end and is provided with a flange 14 slightly spaced in from the remaining end, the end of the stem beyond the flange 14 being externally screw threaded. This threaded end of the bracket member 12 is adapted to be interchangeably fitted through the openings 6 and 9, and a clamp nut 15 is provided to be tightened against the inner side of the case to clamp and securely hold the same in rigid mounting upon the bracket member. A locking washer 16 can be provided to retain the clamping nut 15 in place. A bracket plate 17 provided with openings 18 to receive bolts, screws or other suitable fastening, has a central opening 19, with an externally screw threaded flange 20 around the opening on the upper side. This flange 20 is shaped at its outer end to provide one half of a socket for the bearing ball 13, and a nut 21 turned onto the flange 20 is shaped internally to provide the remaining one half of the ball socket. This nut 21 can be loosened to permit shifting and turning of the ball 13 within the socket to adjust the position of the light casing 1, and the nut 21 is then tightened down against the ball to lock and retain the adjusted setting. Wires 22, an armored cable, or other suitable electrical conductors are led through the bore of the bracket member 12 into the light casing and connected with the lamp socket 23 held by a reflector 24, or otherwise suitably mounted within the casing.

A headed bolt 25 is provided to be fitted through the openings 6 and 9, with the head on the outer side of the casing, and clamp nut 26 is provided on the inner end of this bolt to retain the same in place. The bracket member 12 can be interchangeably connected in either the opening 6, substantially rearwardly of and in line with the line of projection of the light rays from the lamp bulb 2, or can be connected in opening 9 to be at an angle to the line of projection of the light rays, and bolt 25 is employed to close the remaining opening.

Figure 6:
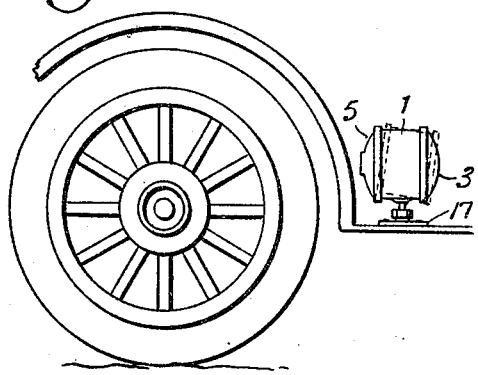
Figure 6 is a fragmentary outline view illustrating the mounting of my improved light on the running board of an automobile.
Figure 7:
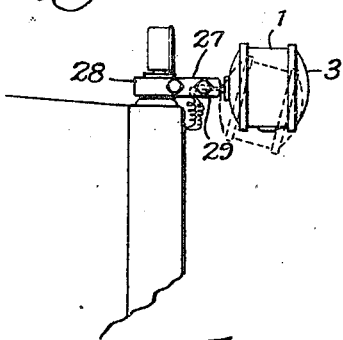
Figure 7 shows a mounting of the light upon the filling neck of an automobile radiator.

As illustrated in Figure 6, my improved road light is mounted on the running board of an automobile adjacent the rear fender. In Figure 7, I have illustrated a slightly different form of bracket member 27 which is constructed at one end to take the ball 13 and is formed at the remaining end, as at 28, to grip around the filler neck of an automobile radiator. With this construction, the ball 13 is held in adjusted positions by means of the clamp screw or bolt 29.

Figure 8:
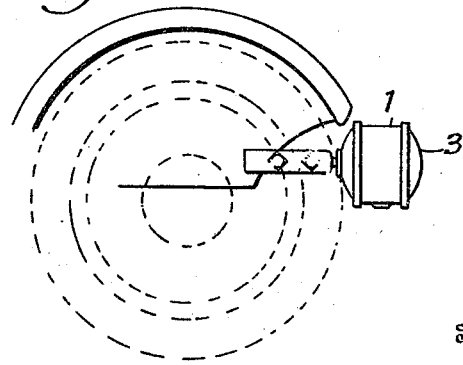
Figure 8 illustrates a mounting upon a portion of a fender.
Figure 9:
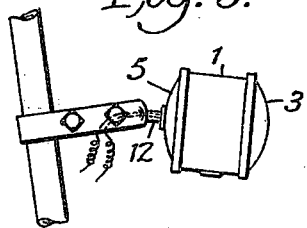
Figure 9 is a similar view showing the mounting upon a windshield support, frame or other rod portion.

In Figures 8 and 9 a supporting bracket similar to the bracket 27 is used, the bracket being clamped to and supported upon the splash apron in the disclosure in Figure 8 and being clamped upon the supporting frame of a windshield in the disclosure in Figure 9.

The bracket plate 17 can be bolted or otherwise secured in place on the front or rear fenders of an automobile, upon a splash apron of the front fenders and can also be bolted or otherwise secured in connection with the radiator core, upon the cowl and in fact upon practically any portion of a motor vehicle, and by interchanging the mounting bracket between the openings 6 and 9, a single lamp is adjustable for use at practically any point upon the front or rear of the machine. The armored cable or wires can be extended through the bore of bracket 12 or where more convenient the bolt 15 might be provided with a central bore so that the wires or cable can be conducted through the light casing at this point. By providing the clamp structure in place of the plate 17, the road light can be clamped upon the bumpers, either forward or rear, and can be readily attached to various portions of the vehicle structure.

As illustrated in Figure 10, two lights are mounted upon the automobile, one being applied to the corner post 30 of the body and the other being secured in front of the radiator by bolts 31 passing through the radiator core. In the latter extension, the cable 22 is conveniently passed back through the radiator core and is extended to a switch 32 mounted on the dash or at any other convenient point within the automobile, the intermediate wire or cord being conveniently looped around the radiator rod for support.

As shown in Figure 11, the road lights can be mounted singly or as a pair, to take the place of the usual cowl lights, and in this adaptation the lamp circuit can be conveniently controlled from the dash switch 33.

In Figure 12 a single road light is illustrated as mounted on the front extension or frame 34, and it will be appreciated that a road light mounted at this position is readily adjusted to focus the light rays at a low elevation, and concentrate the same upon the curb or other portion of the roadway. A lamp might be mounted in substantially the same manner upon the crown or the front curve of the guard or fender 35, but as such mountings would be apparent to a skilled mechanic, I have not illustrated this adaptation.

While I have herein shown and described certain specific constructions and arrangements of parts, and only certain specific mountings and placement of the light for use, it will be appreciated that changes and variations can be made without departing from the spirit and scope of my invention.

I claim:

1. A road light comprising, in combination with a substantially cylindrical lamp casing having one end thereof closed and the remaining end open, said casing being provided with openings through the closed end and through the side wall thereof, a lamp mounted in the open end of the casing, a bracket member interchangeably connected in the openings of the casing provided with a bearing ball at this free end, and a mounting member provided with a socket to receive the bearing ball and support the light casing for universal adjustment.

2. A road light comprising, in combination with a substantially cylindrical lamp casing having one end thereof closed and the remaining end open, said casing being provided with openings through the closed end and through the side wall thereof, a lamp mounted in the open end of the casing, a bracket member interchangeably connected in the openings of the casing provided with a bearing ball at this free end, a mounting member provided with a socket to receive the bearing ball and support the light casing for universal adjustment, and means to temporarily close the remaining opening of the light casing.

3. A road light comprising, in combination with a substantially cylindrical lamp casing having one end thereof closed and the remaining end open, said casing being provided with openings through the closed end and through the side wall thereof, a lamp mounted in the open end of the casing, a bracket member interchangeably connected in the openings of the casing provided with a bearing ball at this free end, a mounting member provided with a socket to receive the bearing ball and support the light casing for universal adjustment, and means to hold adjustments of the light casing.

In testimony whereof I affix my signature.

LEO EDELMANN.